(12) United States Patent
Scott et al.

(10) Patent No.: US 6,599,067 B2
(45) Date of Patent: Jul. 29, 2003

(54) APPARATUS FOR REMOVING PRESSURE TUBES

(75) Inventors: David A. Scott, Mississauga (CA); Ramesh J. Bachan, Etobicoke (CA)

(73) Assignee: Atomic Energy of Canada Limited, Ontario (CA)

( * ) Notice: Subject to any disclaimer, the term of this patent is extended or adjusted under 35 U.S.C. 154(b) by 51 days.

(21) Appl. No.: 09/816,473

(22) Filed: Mar. 26, 2001

(65) Prior Publication Data
US 2002/0133928 A1 Sep. 26, 2002

(51) Int. Cl.⁷ ................................................ B23C 3/00
(52) U.S. Cl. ..................................... 409/143; 166/55.7
(58) Field of Search ................................ 409/143, 139, 409/177, 178, 307, 124; 166/55.7, 55.8, 55

(56) References Cited

U.S. PATENT DOCUMENTS

| | | | | |
|---|---|---|---|---|
| 3,403,597 A | * | 10/1968 | Beckman et al. | 409/143 |
| 3,568,568 A | * | 3/1971 | Mahler | 409/124 |
| 3,868,887 A | * | 3/1975 | Sorenson | 409/143 |
| 4,648,454 A | * | 3/1987 | Yarnell | 166/297 |
| 4,715,751 A | * | 12/1987 | Rigoulot | 409/139 |
| 4,925,621 A | | 5/1990 | Muth et al. | |
| 4,955,951 A | * | 9/1990 | Nemoto et al. | 166/55.7 |
| 5,015,435 A | | 5/1991 | Petit | |
| 5,088,553 A | * | 2/1992 | Ralston et al. | 166/55.7 |
| 5,197,540 A | * | 3/1993 | Yagi et al. | 166/55.8 |
| 5,238,338 A | * | 8/1993 | Stucky | 409/143 |
| 5,408,883 A | | 4/1995 | Clark, Jr. et al. | |
| 5,799,729 A | * | 9/1998 | Breckwoldt et al. | 166/55 |
| 5,951,221 A | * | 9/1999 | Stoves | 409/143 |

FOREIGN PATENT DOCUMENTS

| | | | | |
|---|---|---|---|---|
| CA | 1274322 | | 9/1990 | |
| JP | 0168411 | * | 7/1986 | 409/143 |
| JP | 0015909 | * | 1/1990 | 409/143 |

* cited by examiner

*Primary Examiner*—William Briggs
(74) *Attorney, Agent, or Firm*—Sughrue Mion, PLLC

(57) ABSTRACT

An apparatus and method for removing a pressure tube from a nuclear reactor end fitting. A series of grooves are milled in the inside surface of the pressure tube in the area of the roll fitting by means of an elongated milling tool inserted in the pressure tube. The milling tool has a rotary cutter bit that can be controlled for longitudinal and rotational position and depth of cut from the proximal end of the tool. Once the grooves are milled, the milling tool is withdrawn and replaced with an elongated collapsing tool. The collapsing tool has a pair of jaws that engage the milled grooves and draw the wall of the pressure tube inward thereby releasing it from the end fitting. The use of the present invention avoids the requirement to remove both end fittings to replace a pressure tube.

8 Claims, 8 Drawing Sheets

APPARATUS FOR REMOVING PRESSURE TUBES

This invention relates to a method and apparatus for removing pressure tubes from nuclear reactors. In particular, the invention permits a pressure tube to be removed from the calandria of a nuclear reactor in a manner which requires the removal of only one end fitting from the reactor end shield.

BACKGROUND OF THE INVENTION

In CANDU type nuclear reactors, nuclear fuel is contained in pressure tubes. Each pressure tube is concentrically located within a horizontally disposed calandria tube. Heavy water moderator surrounds the calandria tubes and heavy water coolant circulates through the pressure tubes around the fuel elements.

Each pressure tube extends horizontally through the calandria between the reactor end shields. Each end of the pressure tube is connected to an end fitting which extends through the end shield. The pressure tube is joined to the end fitting by means of a roll joint.

There is a requirement in nuclear reactors to periodically replace pressure tubes, for example in the event that an individual pressure tube develops a leak. The current practice for removal of a pressure tube requires the removal of both end fittings from the end shields at each end of the reactor. To do this, a roller cutter is introduced into the inside diameter of the pressure tube through the end fitting and is advanced to approximately the centre of the tube. The tube is then cut into two pieces. Second and third cuts are made through each pressure tube half, close to each end fitting. The two severed lengths of pressure tube are temporarily retained in the calandria tube. Both end fittings with the stub of pressure tube attached thereto are withdrawn from the end shields. The stub portion of the pressure tube is highly activated and accordingly both end fittings with attached stubs are discarded into separate flasks. The severed lengths of pressure tube are then discarded into a receiving flask.

The requirement to remove both end fittings from the reactor significantly increases the time and cost to remove pressure tubes and increases the radiation dose levels of the fuel channel replacement staff. Thus there is a need for a pressure tube removal procedure which facilitates removal of pressure tubes from nuclear reactors and reduces the amount of time required to complete the procedure.

BRIEF SUMMARY OF THE INVENTION

In accordance with the present invention, there is provided a method and apparatus for removing a pressure tube from a nuclear reactor which requires removing only one end fitting from the reactor plate, and leaving the opposite end fitting intact.

Thus, in accordance with the present invention, there is provided a tool set for disengaging an interference fit between a concentrically aligned outer tube and an inner tube comprising a milling tool adapted to be inserted into said inner tube and comprising a cutting head for forming in the inside surface of the wall of said inner tube adjacent said interference fit an area of reduced wall thickness; a collapsing tool adapted to be inserted into said inner tube and comprising a pair or opposed jaw members for engaging the inside surface of the wall of said inner tube on either side of said area of reduced thickness and a means for activating said jaw members to draw said engaged area toward each other thereby reducing the diameter of said inner tube and disengage said inner tube from said outer tubes.

In accordance with another aspect of the present invention there is provided a tool for milling the inside surface of the wall of a tubular member at a position intermediate the ends of said tubular member, said tool comprising a tubular mounting sleeve adapted to be closely received in and fixed to one end of said tubular member; an elongated cylindrical body having a proximal end and distal end, said proximal end disposed within said mounting sleeve for longitudinal and rotational movement with respect thereto; positioning means fixed to said mounting sleeve for adjusting the longitudinal and rotational positions of said elongated cylindrical body with respect to said mounting sleeve; centering mechanism located within said cylindrical body at said distal end for positioning said body in spaced relation within said tubular member; a milling head located within said cylindrical body intermediate said proximal and distal ends, said milling head comprising a cutting member adapted to be moved from a first position within said cylindrical body and a second position projecting through an opening in said cylindrical body for engagement with the inside surface of the wall of said tubular member; and depth of cut control means located at said proximal end for controlling movement of said cutting member between said first and second positions.

In accordance with another aspect of the present invention, there is provided a collapsing tool for disengaging an interference fit between an outer tube and an inner tube, said inner tube having a weakened area of reduced wall thickness formed on its inside surface adjacent the area of said interference fit, said tool comprising a tubular mounting sleeve adapted to be closely received in and fixed to one end of said tubular member; an elongated cylindrical body having a proximal end and distal end, said proximal end disposed within said mounting sleeve for longitudinal and rotational movement with respect thereto; positioning means fixed to said mounting sleeve for adjusting the longitudinal and rotational positions of said elongated cylindrical body with respect to said mounting sleeve; a jaw assembly located inside said elongated body at said distal end, said jaw assembly comprising a pair of opposed jaw members projecting substantially radially through an opening in the wall of said body, said jaw members capable of being moved from a first open position for engaging the inside surface of the wall of said inner tube on either side of said weakened area to a second closed position to draw said engaged areas toward each other thereby reducing the diameter of said inner tube section and disengaging said inner tube from said outer tube; control means located at said proximal end for controlling the movement of said jaw members between said first and second positions.

In accordance with another aspect of the present invention, there is provided a method for disengaging an interference fit between an outer tube and an inner tube comprising forming in the inside surface of the wall of said inner tube adjacent said interference fit a longitudinal central weakened area of reduced wall thickness; forming in the inside surface of the wall of said inner tube on each side of said central weakened area a groove having longitudinal abutment edges; engaging the abutment edges of said side grooves with opposed jaw members and activating said jaw members to draw said engaged abutment edges toward each other, thereby reducing the diameter of said inner tube section and disengaging said inner tube from said outer tube.

DESCRIPTION OF THE PREFERRED EMBODIMENT

Figure 1:
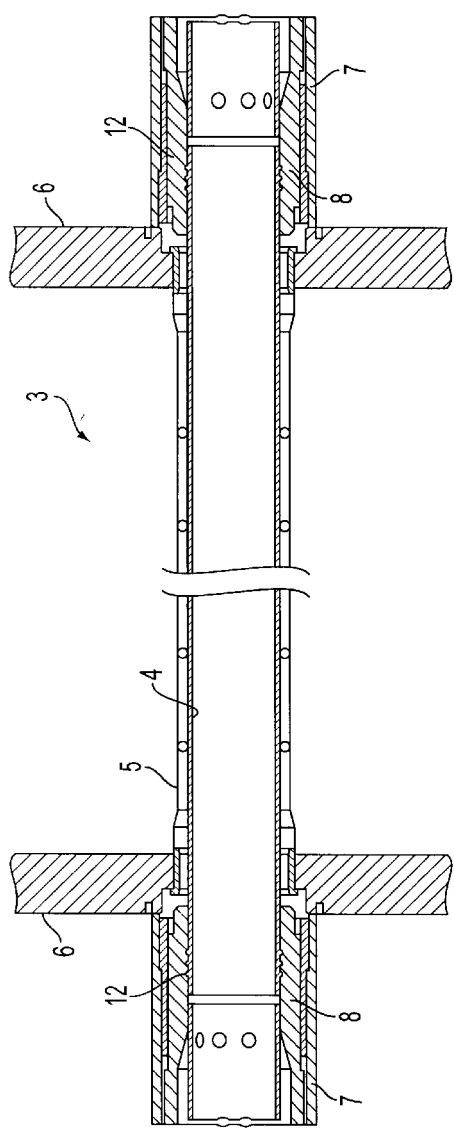
FIG. 1 is cross-sectional view of a fuel channel of a CANDU type nuclear reactor.

The detail of a typical fuel channel is shown in FIG. 1. Pressure tube 4 is coaxially disposed within calandria tube 5 such that an annular space is maintained there between. Pressure tube 4 contains fuel bundles (not shown). Heavy water coolant circulates through pressure tube 4. Gas, typically carbon dioxide, circulates in the annular space between pressure tube 4 and calandria tube 5. Heavy water moderator circulates in the reactor core in the space 3 outside of calandria tube 5.

Figure 2:
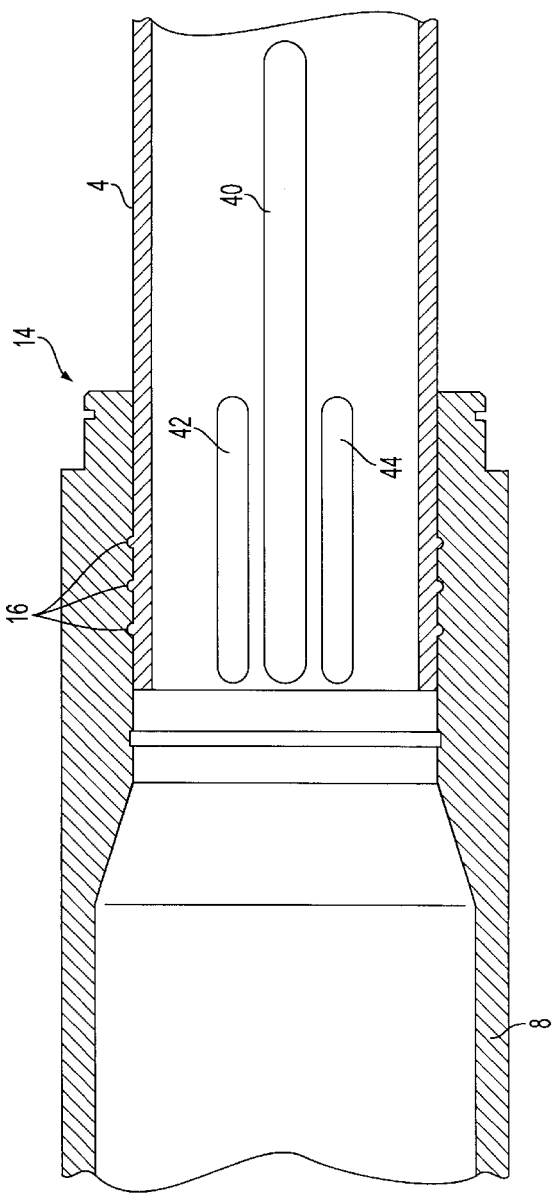
FIG. 2 is a cross-sectional view of the roll joint between the end fitting and the pressure tube with three grooves milled in the inside surface of the roll joint.

Calandria tube 5 is fixed at each end to inner (or calandria side) tube sheets 6. End shield lattice tube 7 extends between inner tube sheets 6 and outer (or fuelling machine side) tube sheets (not shown). Pressure tube 4 is joined to end fitting 8 by means of a mechanical roll joint 12, greater detail of which is shown in FIG. 2.

Inner end 14 of end fitting 8 has three shallow grooves 16 machined into the internal circumferential surface. Pressure tube 4 (shown in phantom) is tightly received into end fitting 8. Mechanical roller pressure applied inside the pressure tube end rolls pressure tube 4 into sealing engagement with end fitting 8 by forming a series of outwardly projecting ridges which engage grooves 16 in end fitting 8. The method and apparatus of the present invention relates to the release of pressure tube 4 from end fitting 8 to facilitate the removal of pressure tube 4 from the reactor.

The apparatus of the present invention consists of a milling tool 30 and a collapsing tool 32. Milling tool 30 is inserted into the end of pressure tube 4 through end fitting 8 and is used to mill a series of grooves in the inside surface of pressure tube 4 at the area of roll joint 12. Thereafter, milling tool 30 is withdrawn and collapsing tool 32 is inserted and is used to engage the milled grooves and collapse the walls of pressure tube 4 inwards so as to free it from engagement with the end fitting 8. In the following description, the tools 30, 32 are described with reference to an inboard end and an outboard end such that when the tools are installed within end fitting 8, the inboard end is the end closest to the centre of the reactor and the outboard end is the end closest to the end shield.

Figure 3:
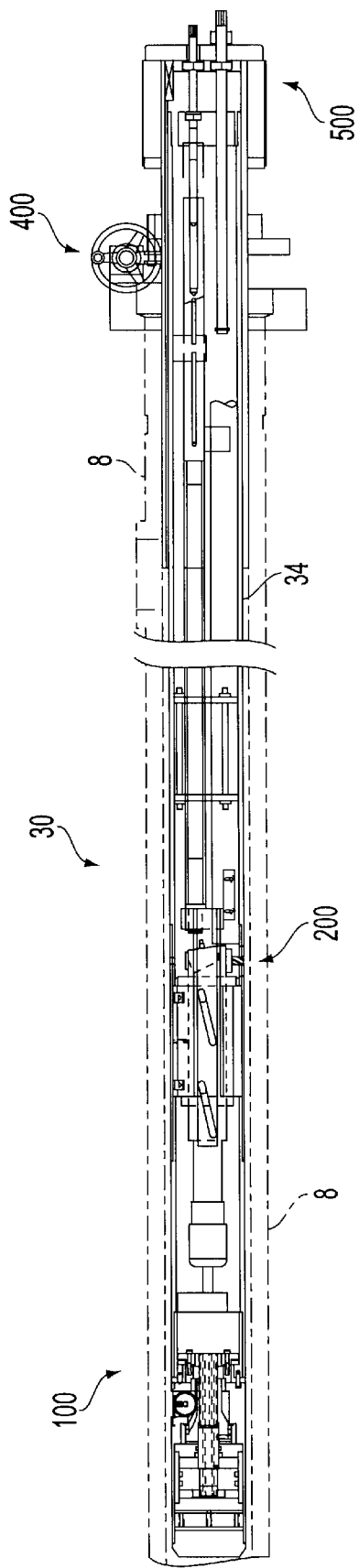
FIG. 3 is cross-sectional view of the milling tool of the present invention.

Referring now to FIG. 3, the milling tool of the present invention, generally indicated by reference numeral 30 is shown. Milling tool 30 has an elongated cylindrical body 34 of a diameter to permit insertion into pressure tube 4 through end fitting 8 (shown in phantom). Milling tool 30 is comprised of four subassemblies which from inboard end to outboard end are centering mechanism subassembly 100, milling head subassembly 200, milling tool rotating subassembly 400 and feed head subassembly 500.

Figure 4:
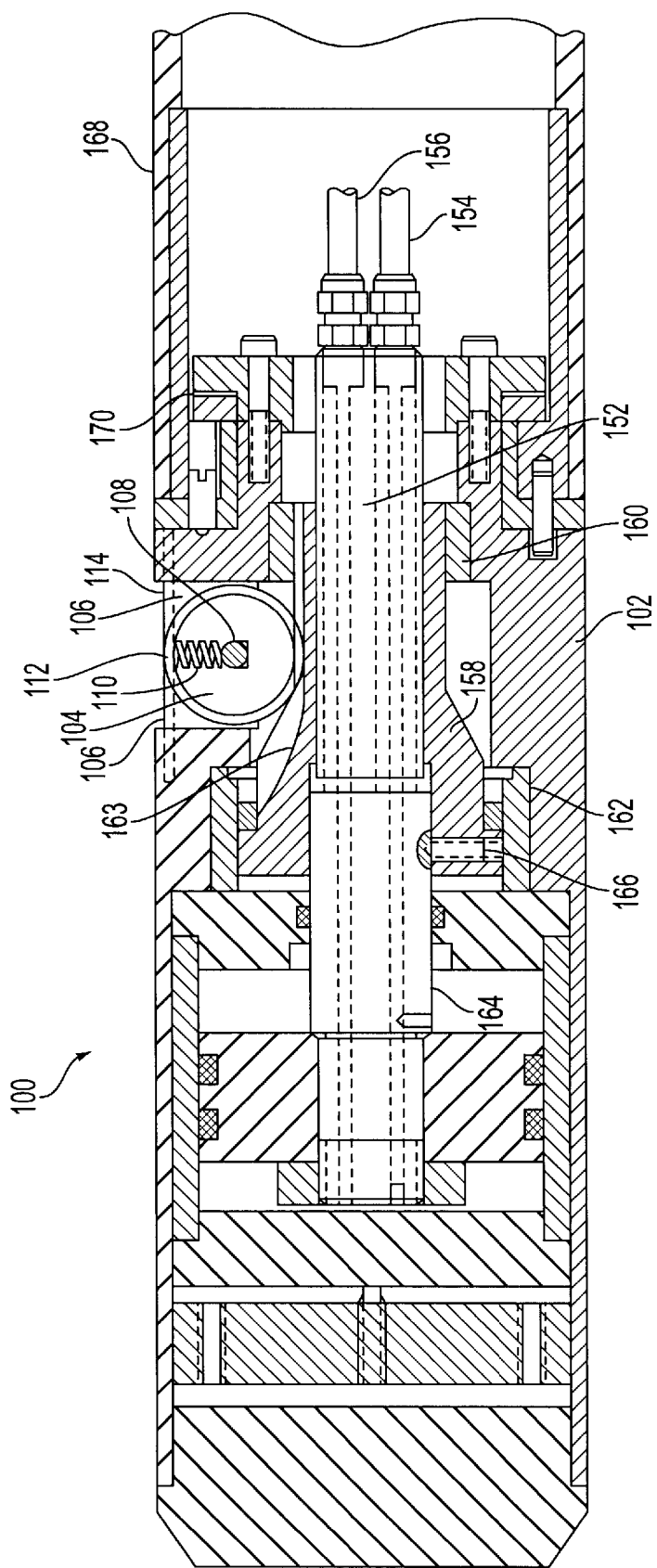
FIG. 4 is a cross-sectional view of the centering mechanism subassembly of the milling tool.

Referring now to FIG. 4, centering mechanism subassembly 100 is shown in greater detail. The purpose of centering subassembly 100 is to maintain milling tool body 34 centrally positioned in generally coaxial relationship within pressure tube 4 and at a known distance from the inside bottom surface of pressure tube 4. Double acting pneumatic cylinder 152 is located within tool body 34 along its central longitudinal axis.

Centering mechanism subassembly 100 includes main body 102 and three centering wheels 104 spaced uniformly around the circumference. FIG. 4 shows one centering wheel 104 at the top or 12:00 o'clock position. The other two wheels 104 at the 4:00 and 6:00 o'clock positions do not appear in the vertical cross-section of FIG. 4. Each centering wheel 104 is received in a slot 106 in main body 102 and is mounted for rotation about axle pin. Axle pin 108 is retained in transverse slot 110 and urged radially inward by spring 112 which is retained in position by cover plate 114.

Ramp body 158 is disposed about cylinder 152 and is slidably retained for longitudinal movement by bearing elements 160 and 162. Ramp body 158 is affixed to movable cylinder 164 by set screw 166. Ramp body 158 is of generally circular cross-section and its diameter increases towards its inboard end. Ramp body 158 carries three outwardly curving ramp surfaces 160 radially aligned with and immediately inboard of centering wheels 104. Outboard motion of ramp body 158 will cause centering wheels 104 to ride up ramp surfaces 163 forcing them radially outward in slots 106. Inboard motion of ramp body 158 will cause centering wheels 104 to ride down ramp surfaces 163 under pressure from spring 112 retracting them radially inward in slots 106.

Air supply lines 154, 156 enter tool body 34 through feed head subassembly 500. By appropriate pressure control, movable cylinder 164 and ramp body 158 can be selectively moved longitudinally toward the inboard direction to cause centering wheels 104 to be withdrawn inside tool body 34 to facilitate insertion into and withdrawal from pressure tube 4. By reversing the airflow to cylinder 152, movable cylinder 164 and ramp body 158 can be selectively moved longitudinally toward the outboard direction to cause centering wheels 104 to project beyond the outer surface of tool body 34 and make contact with the inside wall of pressure tube 4. Contact between centering wheels 104 and pressure tube 4 during operation is maintained by the application of a constant specified air pressure through air supply line 156 to the inboard end of the air cylinder 164. At operational pressure, the centering wheels 104 can accommodate ovality and variations in the internal diameter of pressure tube 4. In order to retract centering wheels 104, air supply line 156 is pressure relieved and the front cavity of the cylinder is pressurized via air supply line 154 causing the piston to move inboard and consequently pulling ramp body 102 with it.

Figure 5:
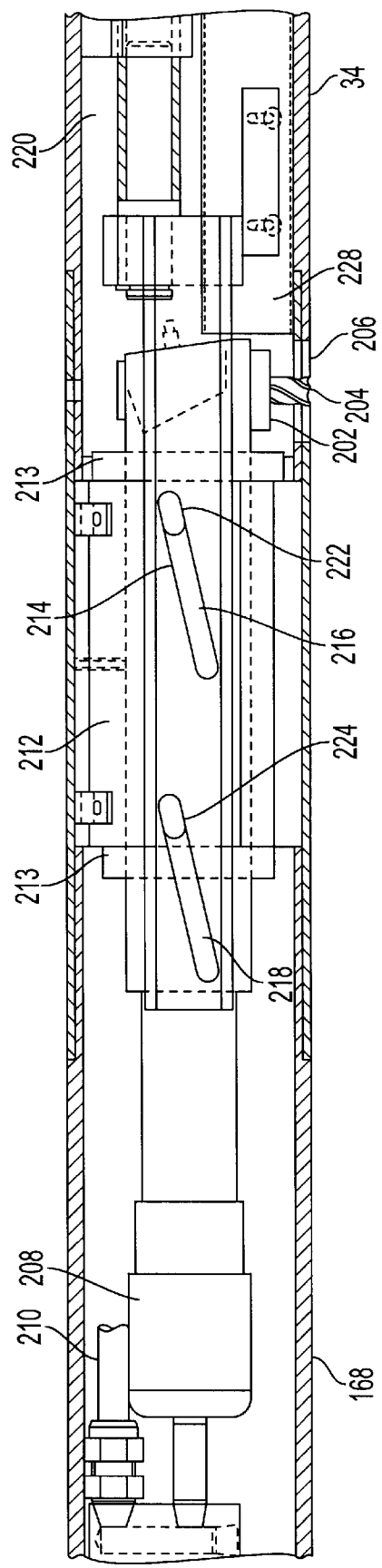
FIG. 5 is a cross-sectional view of the milling head subassembly of the milling tool.

Referring now to FIG. 5, milling head subassembly 200 is shown in greater detail. The purpose of milling head subassembly 200 is to drive a milling cutter to machine grooves in the inner circumferential surface of the wall of pressure tube 4.

Milling head subassembly 200 is located in tool body 34 outboard of centering mechanism subassembly 100. Centering mechanism subassembly 100 is connected to milling head subassembly 200 by transition tube 168 and thrust bearing 170 (see FIG. 4.) Transition tube 168 connects the centering mechanism sub-assembly 100 to the rest of the tool and provides longitudinal space for housing the milling head air motor 208 and associated air supply lines, one of which is indicated by reference numeral 210. Thrust bearing 170 permits rotation, with minimal frictional resistance between the centering mechanism subassembly 100 and the rest of the tool. This permits centering mechanism subassembly 100 to engage the inside walls of pressure tube 4 and remain fixed against rotation while the rest of tool 34 can be rotated about its longitudinal axis.

Milling head subassembly 200 includes 90° milling head 202 which is fitted with cutter bit 204. Cutter bit 204 is a ½ inch diameter four fluted rotary cutter which is set within a ⅜ inch diameter collet. Cutter bit 204 is disposed radially within tool body 34 with its cutting tip centrally disposed within opening 206 on tool body 34. Milling head 202 is driven by air motor 208 which is fed by air supply line 210 which enters tool body 34 through feed head subassembly 500.

The movement of cutter bit 204 is controlled in three respects. Firstly, cutter bit 204 can be radially extended and retracted through opening 206. This movement controls the depth of cut and is also used to achieve a plunging action during the milling process. To accomplish these movements, milling head 202 and air motor 208 are fitted precisely within housing 212. Housing 212 is held between two restraint plates 213 which prevent longitudinal movement when milling head 202 is extended or retracted and between longitudinal plates 214, only one of which is shown in FIG. 5. Each plate 214 has a pair of oblique slots 216, 218 which extend from a lower inboard position to an upper outboard position. Plates 214 are connected to draw bar 220 which extends longitudinally through tool body 34 to milling tool rotating subassembly 400. Housing 212 is fitted with lugs 222, 224 which are retained in slots 216, 218. Longitudinal movement of draw bar 220 and side plates 214 causes housing 212 to move transversely as lugs 222, 224 follow oblique slots 216 and 218. By precise control of draw bar 220, cutter bit 204 can be moved radially inward and outward to achieve the desired depth of cut. Draw bar 220 is accessible at the outboard end of feed subassembly 500. The precise depth of cut is monitored by a rotary encoder geared to the feed screw and a calibrated counter positioned on the feed subassembly as described below.

Figure 6B:
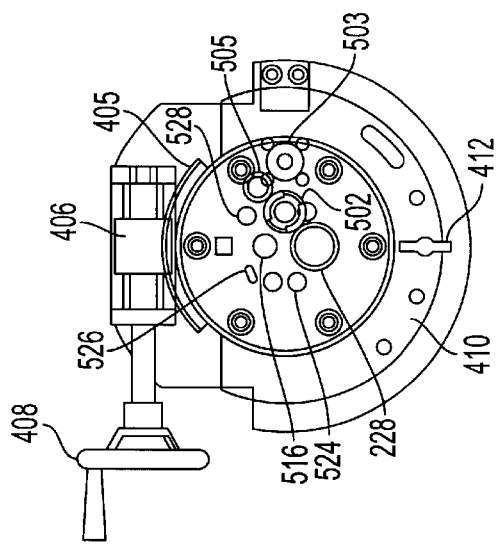
FIG. 6b is an end view of the milling tool.
Figure 6A:
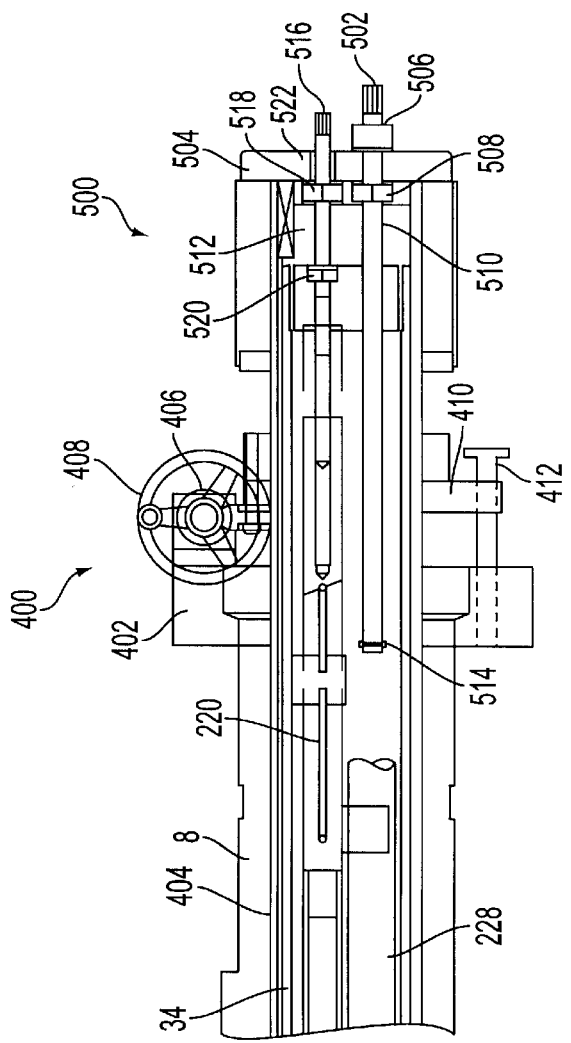
FIG. 6a is a partially revolved cross-sectional view of the rotating mechanism of the milling tool.
Figure 7:
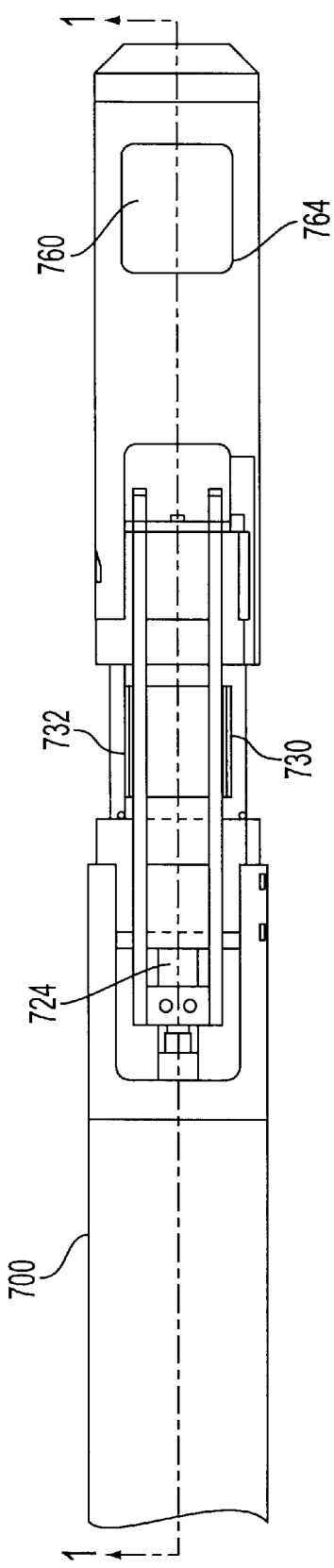
FIG. 7 is an plan view of the collapsing jaw and interference pad subassemblies of the collapsing tool.
Figure 8:
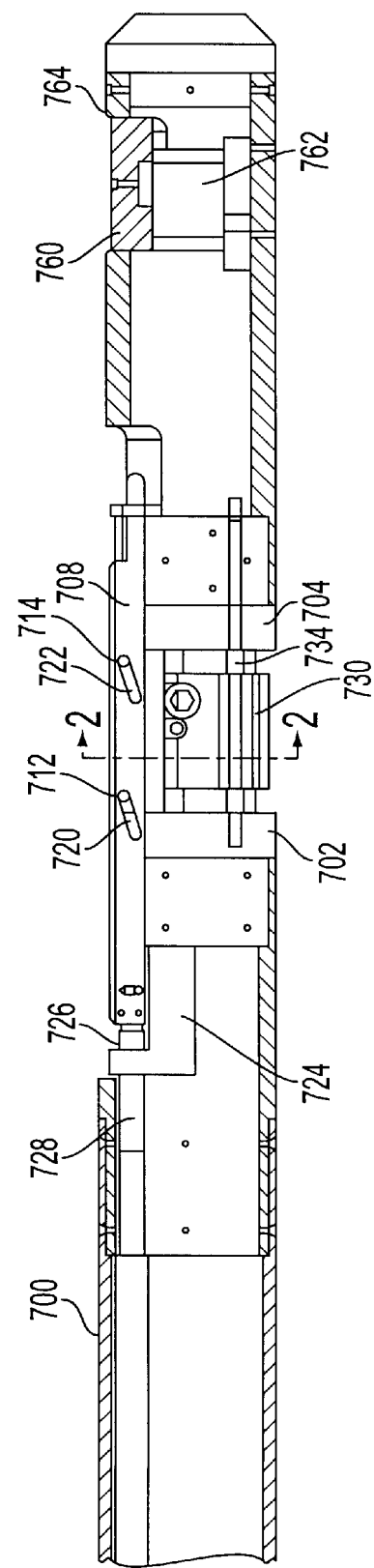
FIG. 8 is a longitudinal cross-sectional view of the collapsing jaw and interference pad subassemblies of the collapsing tool internal pad subassembly of the collapse ing tool taken along line 1—1 shown in FIG. 7.
Figure 9:
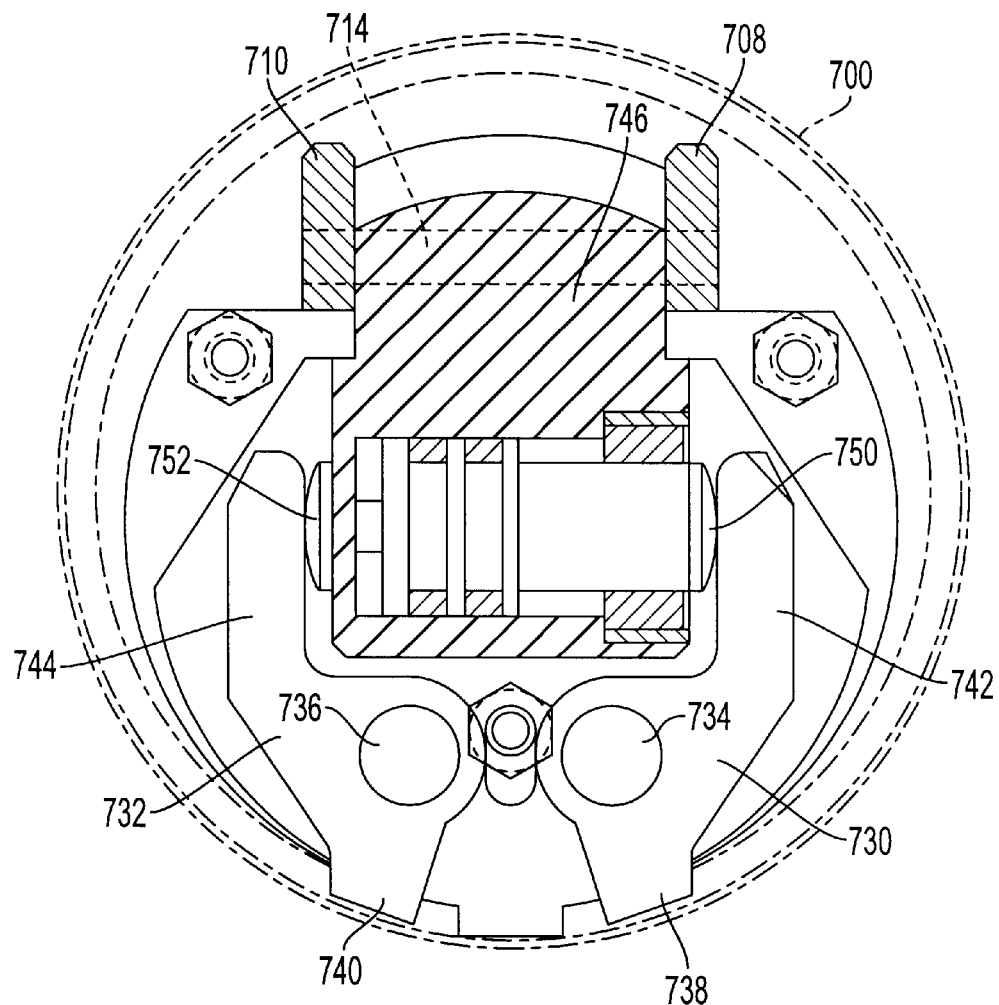
FIG. 9 is a transverse cross-sectional view of the collapsing jaw subassembly of the collapsing jaw subassembly taken along line 2—2 shown in FIG. 8.
Figure 10:
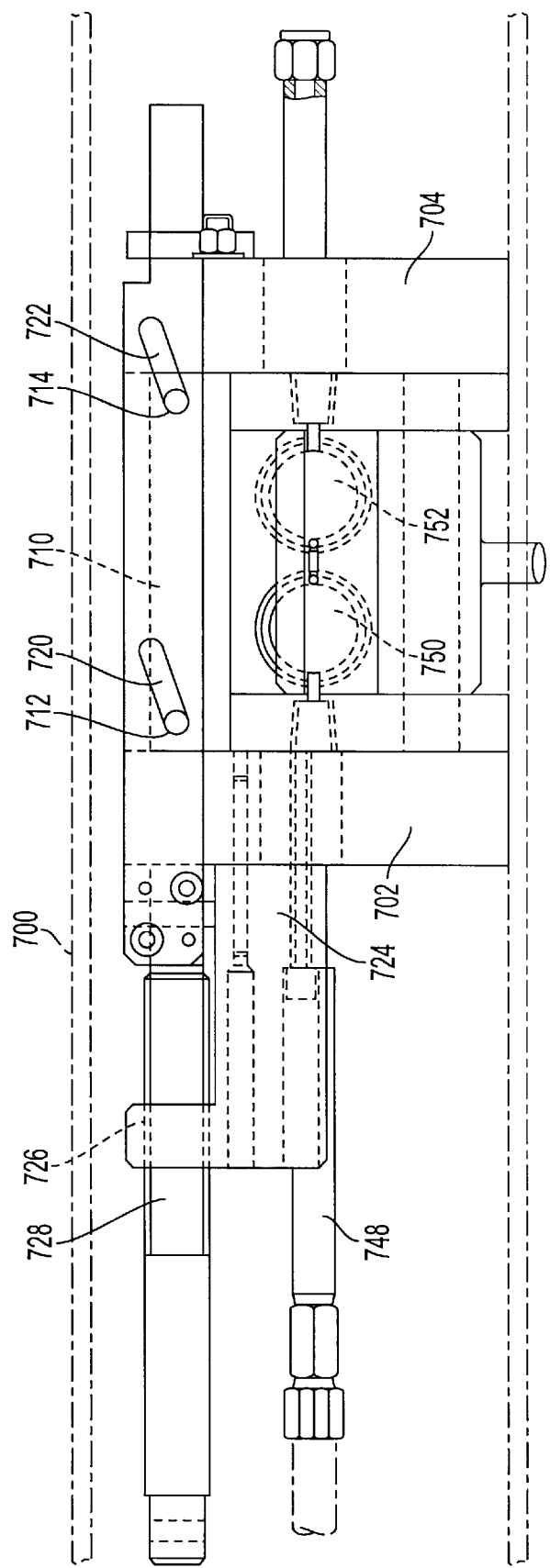
FIG. 10 is a side view of the collapsing jaw subassembly.

The second manner in which the movement of the cutter bit 204 is controlled is in the plane transverse to the longitudinal axis of tool body 34 to control its radial position. This movement is controlled by milling tool rotating mechanism subassembly 400. As shown in FIGS. 6a and 6b, mounting bracket 402 is fixedly secured to the outboard end of end fitting 8. Sleeve 404 is closely received in mounting bracket 402 and end fitting 8. Sleeve 404 acts as a guide element in which tool body 34 can be moved longitudinally. Sleeve 404 carries wheel gear 405 on it outer surface that registers with worm gear 406 which is driven by hand wheel 408. Rotation of hand wheel 408 permits tool body 34 to be rotated about its longitudinal axis and cutter bit 204 radially positioned for milling operations. Index plate 410 is fixed to mounting bracket 402 and provides a plurality of indexed stops at desired positions. Indexing pin 412 engages the indexed stops and secures tool body 34 against rotation during milling operations. The indexed stops are located to secure cutter bit 204 at the 6:00 o'clock position to mill a centre groove and at positions 20° clockwise and counterclockwise off this position to mill two side grooves as described below. While rotation of handle wheel 408 rotates tool body 34, centering mechanism 100 is fixed against rotation by frictional contact of centering wheels 104 with the inside surface of pressure tube 4. Transition tube 168 and thrust bearing 170 permit relative rotation between tool body 34 and centering mechanism 100.

The third manner in which the movement of the cutter bit 204 is controlled is along the longitudinal axis of tool body 34. This is accomplished by feed subassembly 500 shown in FIGS. 6a and 6b. Feed subassembly 500 is located at the extreme outboard end of tool body 34. Axial feed screw 502 is retained in end plate 504 by collars 506, 508 and can be turned by any suitable rotary means at its extreme outboard end. As shown in FIG. 6b, axial feed screw 502 is turned by axial feed motor 503 through idler gear 505. Note that FIG. 6a is a partially revolved sectional view to permit axial feed screw 502 and depth of cut feed screw 516 to each be shown. The true position of these feed screws is shown in FIG. 6b.

Inboard of retaining collar 508, axial feed screw 502 is externally threaded and engages internal threads in bore 510 of end block 512 which is connected to the end of tool body 34. By turning axial feed screw 502, end block 512 and tool body 34 can be precisely driven in a longitudinal direction. Axial feed screw 502 is fitted with stop 514 which upon abutment with end block 512 limits the inboard extent of movement of tool body 34 and therefore provides an indexed stop for the groove to be milled in pressure tube 4.

Depth of cut feed screw 516 is retained in end block 512 by collars 518 and 520 and moves longitudinally with end block 504. Depth of cut feed screw 516 can be turned by any suitable rotary means at its extreme outboard end. Such turning means is of sufficient length to extend through aperture 522 in end plate 504 when end block 512 is at its extreme inboard limit. Inboard of retaining collar 520, depth of cut feed screw 516 is externally threaded and engages internal threads in the outboard end of draw bar 220. By turning depth of cut feed screw 516, draw bar 220 can be precisely driven in a longitudinal direction and accordingly, the depth of cut of cutting bit 204 at the inboard end of draw bar 220 can be precisely controlled. A shaft encoder, (not shown) can be mounted on end block 512 to engage depth of cut feed screw 516 and the associated cabling routed out through an opening (for example opening 524) in end plate 504 to permit precise measurement of depth of cut. Similarly, air supply lines 154 and 156 to centering mechanism subassembly 100 can be routed out through dual openings 526 in end plate 504 and air supply line 210 to milling head air motor 208 can be routed out through opening 528.

Milling head subassembly 200 is equipped with a vacuum system to collect and discard the swarf creating during the milling process. The system consists of metal shroud 226 (not shown) which encompasses the milling head. Vacuum is applied through 1.5" suction pipe 228 which is routed out through end plate 504 to a flask for containing the irradiated swarf. The vacuum system generates sufficient airflow and has filtering and recovery capacity to ensure safe and reliable collection of irradiated debris generated during the milling operation.

The collapsing tool of the present invention will now be described with reference to FIGS. 7 to 10. The collapsing tool is housed in an elongated tube 700 of a diameter to permit it to be is inserted and closely received in pressure tube 4 and of a length to permit it to reach the milled area at the outboard end of pressure tube 4 just inboard of end fitting 8. The collapsing tool comprises a collapsing jaw subassembly and an interference pad subassembly which are located on generally opposite sides of the collapsing tool near its inboard end.

The collapsing jaw subassembly is generally housed between transverse outboard bulkhead 702 and transverse inboard bulkhead 704. Opposing jaw members 730, 732 are pivotally mounted on pins 734, 736 which are parallel to the longitudinal axis of the tool. Jaw members 730, 732 have jaws 738, 740 which are shaped to engage the grooves milled in pressure tube 4. Lever arms 742, 744 extend on opposite sides of double piston hydraulic cylinder block 746. High pressure hydraulic fluid is supplied to cylinder block 746 through hydraulic supply line 748. When cylinder block 746 is pressurized, pistons 750, 752 simultaneously move lever arms 742, 744 outwards causing jaw members 730, 732 to pivot about pins 734, 736 and jaws 738, 740 to swing towards each other. When jaws 738, 740 are engaged in grooves milled in pressure tube 4, the grooves are forced together effectively making the diameter of the pressure tube smaller. This causes pressure tube 4 to be released from roll joint 12 in end fitting 8.

Side plates 708, 710 are connected at their outboard end to draw block 724. Draw block 724 has internally threaded bore 726 that mates with externally threaded draw bar 728. Draw bar 728 extends from the collapsing jaw tool to the outboard end (not shown) of elongated tube 700 where it can be rotated. Rotation of draw bar 728 will accordingly cause draw block 724 and side plates 708, 710 to move longitudinally with respect to bulkheads 702 and 704 within tube 700. Side plates 708, 710 have oblique slots 720 and 722 formed therein. Transverse dowels 712 and 714 in hydraulic cylinder block 746 extend into slots 720 and 722. By rotating draw bar 728, oblique slots 720 and 722 will cam dowels 712 and 714 and hydraulic cylinder block 706 will be caused to move in a transverse direction. This permits jaws 738 and 740 to be moved into and out of engagement with the grooves milled in pressure tube 4.

The collapsing tool includes interference pad 760 which has a convex generally rectangular outer surface shaped to conform with the curvature of the pressure tube inside wall. Interference pad 760 is affixed to hydraulic cylinder 762. When cylinder 762 is energized, interference pad 760 projects through similarly dimensioned generally rectangular opening 764 in tool body 700 and contacts the inside surface of pressure tube 4. This causes jaws 738, 740 to remain firmly engaged in the milled grooves. In addition, after the pressure tube is collapsed in end fitting 8, the contact between interference pad 760 and pressure tube 4 creates sufficient friction during pressure tube removal to allow pressure tube 4 to be pushed out of roll joint 12 without slipping. When hydraulic pressure is released, interference pad 760 returns to its original position, assisted by tensile spring return inherent to the hydraulic cylinder (not shown).

The use of the present invention to remove a pressure tube from a reactor will now be described. Pressure tube 4 is first cut into two sections at its centre by means of a roller cutter inserted therein through end fitting 8. Second and third cuts are then made at each end of the pressure tube near end fittings 8 resulting in two pressure tube stubs each attached to its end fitting and two severed lengths of pressure tube retained within the calandria tube. One of the pressure tube stubs is removed from its end fitting by means of the method and apparatus of the present invention.

The milling tool of the present invention is first inserted through the outboard end of end fitting 8 and secured thereto. The length of the milling tool is such that milling head subassembly 200 corresponds to the area of the roll joint between end fitting 18 and pressure tube 10. Once milling tube has been positioned and anchored in place, air pressure is applied to centering mechanism subassembly 100 to ensure that the inboard end of tool is centred in pressure tube 4. Tool body 34 is rotated by means of hand wheel 408 of milling tool rotating subassembly 400 to position cutting bit 204 at the 6:00 o'clock position at the bottom of the inside circumference of pressure tube 4. Axial feed screw 502 is adjusted such that end block 512 is at its outboard limit of movement before the milling operation is commenced. This causes cutting bit 204 to register with the extreme outboard end of pressure tube 4 in roll joint 12. Air pressure is supplied to air motor 208 and vacuum is supplied to suction line 228. Cutting bit 204 is brought into engagement with the inside surface of pressure tube 4 and a plunge cut is made to the desired depth. Axial feed screw 502 is then rotated to slowly advance tool body 34 and cutting bit and mill a longitudinal groove in the bottom of pressure tube 4. The groove should be of sufficient length to extend past the inboard end of end fitting 8 by a distance equal to approximately twice the diameter of the pressure tube. The depth of the groove should be sufficient to enable the remaining tubing material in the groove to readily fracture under the action of the collapsing tool of the present invention or as a result of residual stress in the tubing material, but not so deep as to risk milling completely through the wall of pressure tube 4 into end fitting 8. In practice, it has been found that a milling depth leaving approximately 0.005" to 0.010" of wall thickness in the bottom of the central groove is effective. The cut is made from the outboard end of the pressure tube to the inboard end.

Once the central groove at the 6:00 o'clock position has been milled, tool body 34 is rotated by means of hand wheel 408 of milling tool rotating subassembly 400 to position cutting bit 204 at 20 degrees clockwise from the 6:00 o'clock position and is advanced approximately 0.5" before the second groove is milled. The operation is repeated to mill a third groove at 20 degrees counterclockwise from the 6:00 o'clock position. The depth of the second and third grooves need only be sufficient to permit jaws 738, 740 of the collapsing tool to be securely engaged therein during the collapsing operation. In practice, it has been found that a milling depth leaving approximately 0.003" to 0.004" of wall thickness in the bottom of the second and third grooves is effective. The length of the second and third grooves is such that they extend over the entire roll joint 12 and preferably past this point to the extreme inboard end of end fitting 8. Referring now to FIG. 2, the preferred relative positions of the first groove 40, second groove 42 and third groove 44 are shown.

Jaws 738, 740 should have a longitudinal length such that they engage the second and third grooves over substantially their entire length and when in the fully open position, register radially with the second and third grooves.

The vacuum system is operated concurrently with the operation of the milling head. As such, the swarf of radioactive pressure tube fragments is suctioned into an appropriate flask for disposal of in a suitable manner.

Once the central groove and the two side grooves have been milled, the cutting bit 204 is withdrawn into tool body 34 and the centering mechanism subassembly 100 is deactivated causing centering wheels 104 to retract within tool body 34. Milling tool rotating mechanism subassembly 400 is then disengaged from end fitting 8 and the milling tool is withdrawn.

Once the milling tool has been removed, the collapsing tool is inserted into the end fitting 8 and is secured to end fitting 8 and indexed to position interference pad 760 at the 12:00 o'clock position and jaws 738, 740 equidistant from the 6:00 o'clock position corresponding with the location of second groove 42 and third groove 44. Although not shown in the Figures, the collapsing tool is secured to end fittings 8 and rotated radially in a manner similar to that described above with reference to milling tool 30. Draw bar 728 is rotated to extend jaws 738, 740. Interference pad 760 is then activated to contact and apply counter pressure to the inner surface of pressure tube 4 and force jaws 738,740 into engagement with second and third grooves 42, 44. Collapsing tool cylinder block 746 is pressurized causing jaw members 738, 740 to draw second and third grooves 42, 44 together. Due to the weakened integrity of the pressure tube stub wall at the area of the central groove 40, the pressure tube stub fractures along the central groove, if it has not already done so as a result of the milling operation. Further collapsing movement of jaws 738, 740 causes the pressure tube wall material on either side of central groove 40 to tend to overlap and the diameter of the pressure tube stub at the area of the grooves is reduced sufficiently to disengage the roll joint between the pressure tube stub and end fitting 8. With pressure continuing to be applied to interference pad 760, the collapsing tool can be advanced further through end fitting 8, causing the pressure tube stub that has been released from roll joint 12 to be pushed inboard into the calandria tube with out slipping. Interference pad 760 can then be deactivated and the collapsing tool withdrawn from end fitting 8 leaving the pressure tube stub in the calandria tube. All severed pressure tubing sections can then be removed from the calandria tube by removal of the end fitting from the opposite face of the reactor. Thus, use of the present invention avoids the requirement to remove both end fittings to replace a pressure tube.

The invention has been described in relation to a preferred embodiment thereof. A person skilled in the art will appreciate that modifications to the invention can be made without departing from the spirit and the scope thereof.

We claim:

1. A tool for milling the inside surface of the wall of a tubular member at a position intermediate the ends of said tubular member, said tool comprising;
    a tubular mounting sleeve adapted to be closely received in and fixed to one end of said tubular member;
    an elongated cylindrical body having a proximal end and distal end, said proximal end disposed within said mounting sleeve for longitudinal and rotational movement with respect thereto;
    positioning means fixed to said mounting sleeve for adjusting the longitudinal and rotational positions of said elongated cylindrical body with respect to said mounting sleeve;
    centering mechanism located within said cylindrical body at said distal end for positioning said body in spaced relation within said tubular member;
    a milling head located within said cylindrical body intermediate said proximal and distal ends, said milling head comprising a cutting member adapted to be moved from a first position within said cylindrical body to a second-position projecting through an opening in said cylindrical body for engagement with the inside surface of the wall of said tubular member;
    depth of cut control means located at said proximal end for controlling movement of said cutting member between said first and second positions.

2. The milling tool of claim 1 wherein said depth of cut control means comprises a longitudinally moveable slide member having a first abutment surface in camming engagement with a second abutment surface on said milling head, said first abutment surface, whereby longitudinal movement of said slide member cams said milling head in a transverse direction.

3. The milling tool of claim 1 wherein the portion of said cylindrical body at said distal end in which said centering mechanism is disposed is connected for rotational movement with respect to the remainder of said cylindrical body.

4. The milling body of claim 3 wherein said centering mechanism comprises a plurality of rollers disposed radially about the longitudinal axis of said cylindrical body, each roller adapted to be moved between a first position within said cylindrical body and a second position projecting through an opening in said cylindrical body for rotational engagement with the inside surface of the wall of said tubular member when said cylindrical body is moved longitudinally with respect thereto and centering control means located at said proximal end for controlling movement of said rollers between said first and second positions.

5. The milling tool of claim 4 wherein said centering mechanism comprise a ramp member, said ramp member having a plurality of ramp surfaces extending outward from the longitudinal axis of said cylindrical body, each ramp surface engaging a corresponding one of said rollers, said ramp member being responsive to said centering control means for reciprocal movement along the longitudinal axis of said cylindrical body for moving said rollers between said first and second positions.

6. The milling tool of claim 5 including a pneumatic drive cylinder mounted in the portion of said cylindrical body at said distal end in which said centering mechanism is disposed responsive to said centering control means for imparting reciprocal movement to said ramp member.

7. The milling tool of claim 1 wherein said milling head includes a rotary drive housing in which said cutting member is retained and a cam member disposed within said cylindrical and engaging said housing, said cam member being responsive to said depth of cut control means for reciprocal movement of said rotary drive housing in a direction transverse to said longitudinal axis and said cutting member between said first and second positions.

8. The milling tool of claim 1 further comprising an elongated vacuum conduit extending within said cylindrical body from said milling head to said proximal end for drawing milled swarf from said cutting member.

* * * * *